United States Patent [19]

Gwaltney

[11] 4,168,733
[45] Sep. 25, 1979

[54] TIRE CHANGING APPARATUS

[75] Inventor: Robert E. Gwaltney, Brentwood, Tenn.

[73] Assignee: The Coats Company, Inc., La Vergne, Tenn.

[21] Appl. No.: 908,252

[22] Filed: May 19, 1978

[51] Int. Cl.² .............................................. B60C 25/08
[52] U.S. Cl. .................................................. 157/1.28
[58] Field of Search ............................ 157/1.24, 1.28

[56] References Cited

U.S. PATENT DOCUMENTS

| | | | |
|---|---|---|---|
| 3,246,681 | 4/1966 | May | 157/1.28 |
| 3,255,800 | 6/1966 | Strang et al. | 157/1.24 |
| 3,398,777 | 8/1968 | Strang | 157/1.28 |
| 3,742,999 | 7/1973 | Myers, Jr. | 157/1.28 |
| 3,827,475 | 8/1974 | Brosene, Jr. | 157/1.28 |

Primary Examiner—James G. Smith
Attorney, Agent, or Firm—Wegner, Stellman, McCord, Wiles & Wood

[57] ABSTRACT

A tire changing apparatus of the type having a base, a table mounted on the base for receiving and supporting a wheel, a rotatable tool driving post extending through the table, an upper bead loosener assembly engageable with the upper side wall of a tire received on the table, a lower loosening assembly engageable with the lower side wall of a tire on the table and a motor for driving the bead looseners and the post. Included is an extendable connection between the lower bead loosener and the drive which may be utilized to facilitate loosening beads on small diameter wheels and which automatically restores itself to a normal configuration. Also included is a guide for the upper bead loosener which is movably mounted to guide the upper bead loosener generally radially of a wheel for positioning purposes. Interengageable brake surfaces are provided in connection with the guide and are engaged in response to actuation of the motor to lock the guide in a desired position of adjustment during the servicing operation. Additionally included is a pin and slot connection interconnecting the upper bead loosener and part of the drive mechanism whereby the upper bead loosener may be disconnected from the drive mechanism as desired.

16 Claims, 4 Drawing Figures

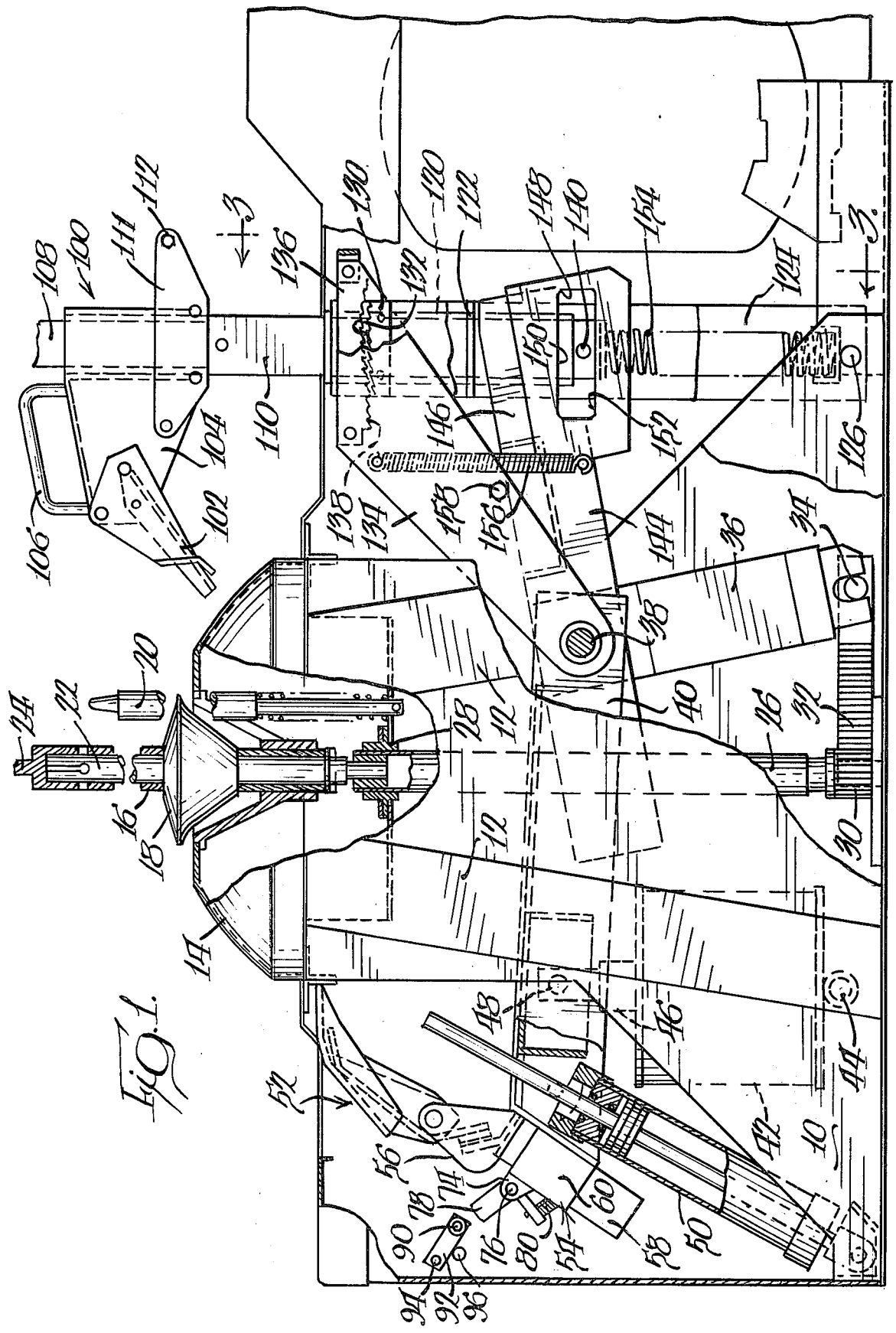

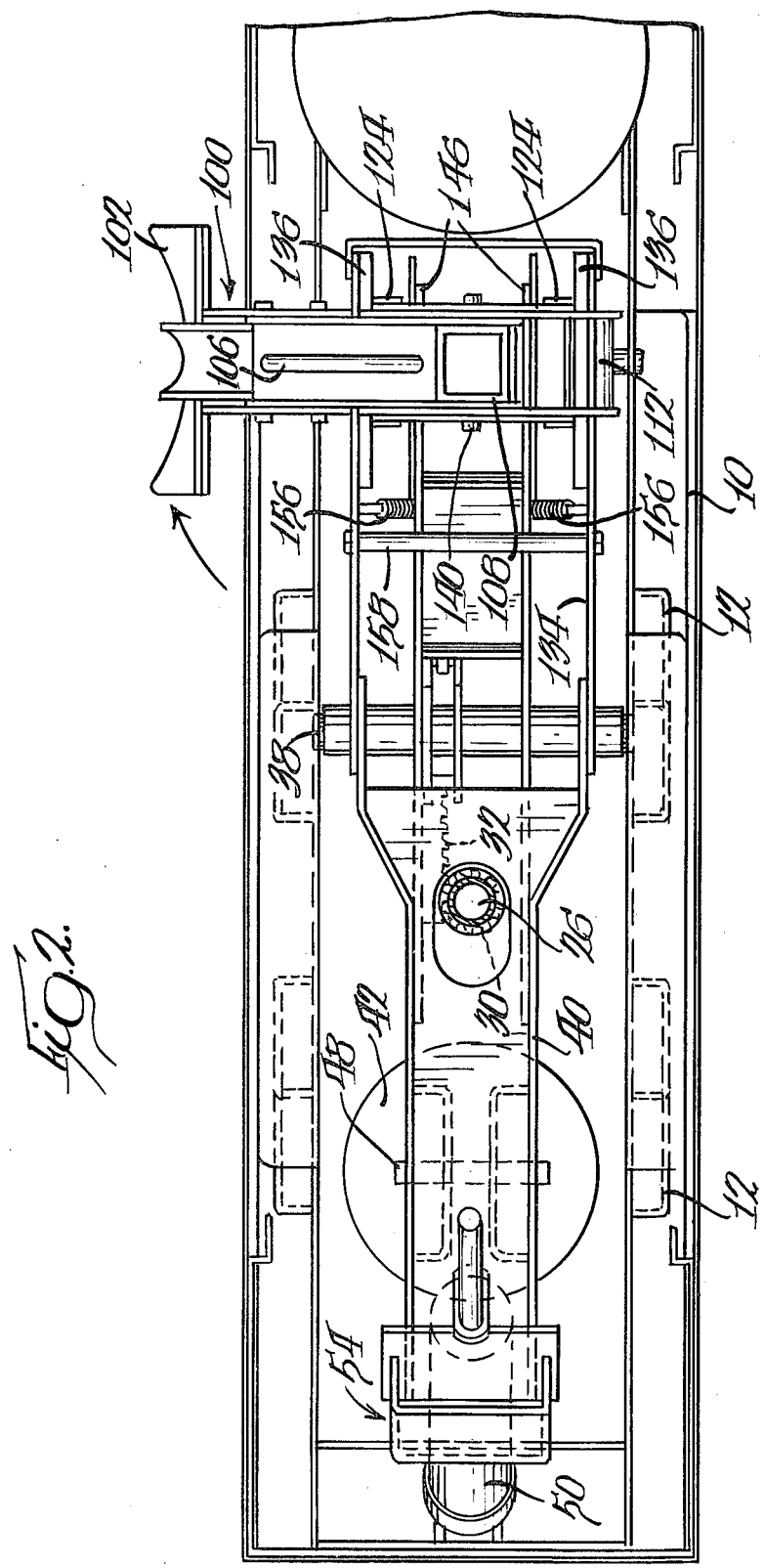

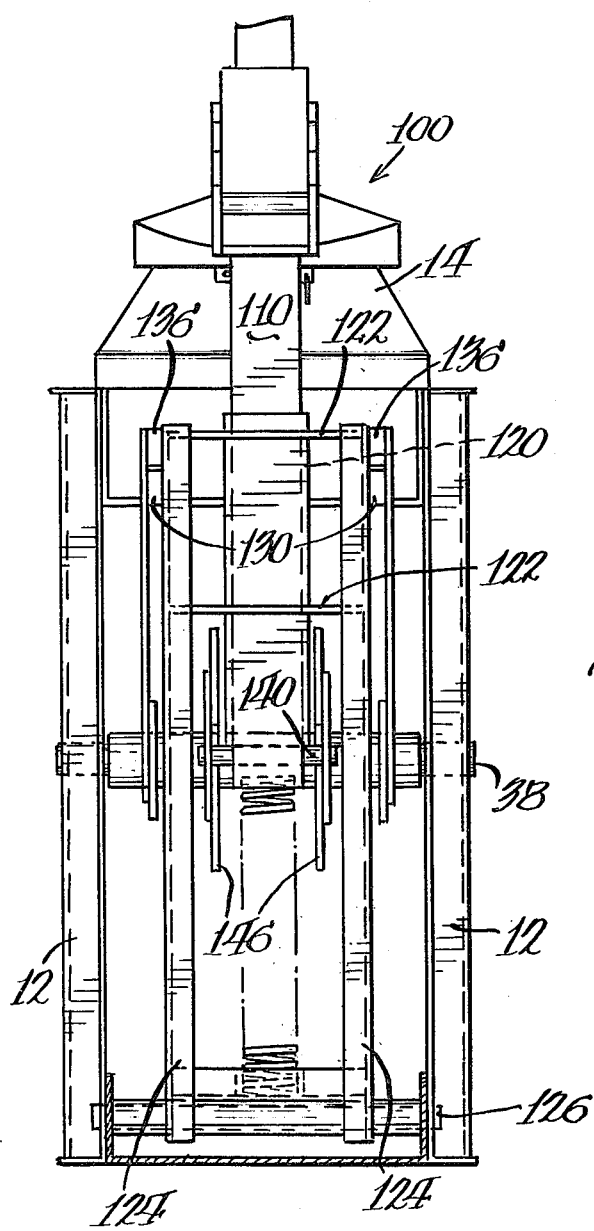
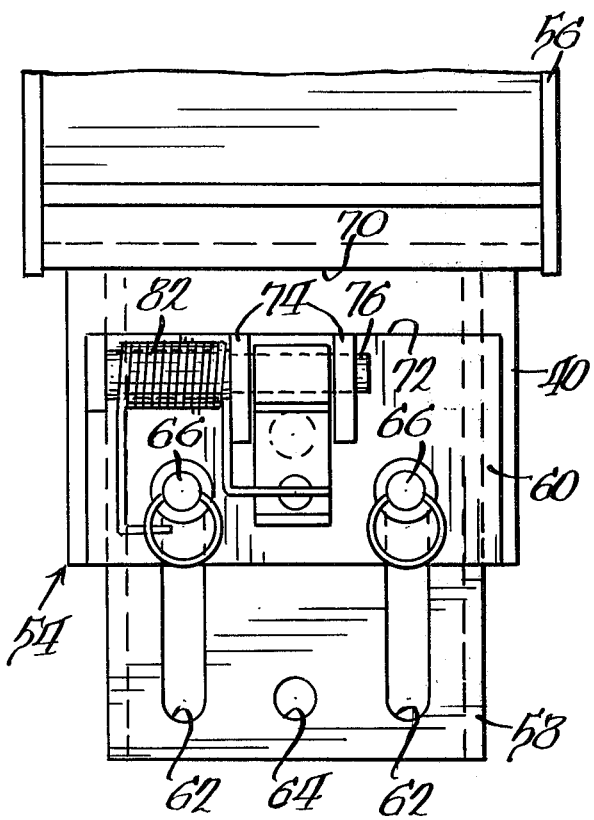

TIRE CHANGING APPARATUS

BACKGROUND OF THE INVENTION

This invention relates to tire changing apparatus.

In U.S. Pat. No. 3,255,800 issued June 14, 1966 to Strang, et al, there is disclosed a tire changing apparatus which has been manufactured and sold in considerable quantity over the years and has achieved considerable commercial success. The apparatus loosens both upper and lower beads of a tire on a wheel received on a tire changing table as well as drives a tire changing tool.

In the process of a bead loosening operation, an upper bead loosening assembly is manually positioned with respect to the upper bead of a tire prior to actuation of the machine. The upper bead loosener assembly includes a shoe which is engaged with the upper bead, a mounting shaft for the shoe which is selectively engageable with a lever driven by a motor, and a nose formation which is disposed on the inner surface of a wheel to properly orient the shoe prior to engergization of the motor.

While the bead breaker assembly is composed of a number of parts, they are all interconnected and as a consequence, the entire assembly must be supported during the positioning process. Because of the number of parts involved, the weight of the assembly is not inconsequential and in a high volume operation, the user of the apparatus may experience some fatigue during the course of positioning the upper bead loosener assembly.

As a consequence, in order to minimize the weight of the upper bead loosener that must be shifted to achieve positioning, it has been proposed to affix the shoe mounting shaft to the power system of the apparatus so as to be supported thereby while providing an adjustable connection between the shoe and the shaft. In the usual case, the shaft extends generally vertically so a first adjustable connection is provided so that the initial height of the bead loosening shoe may be adjusted in the vertical direction for wheels of differing widths. Because wheels also have varying diameters, it is necessary to provide a second adjustable connection whereby the shoe may be adjustably positioned generally radially of the wheel.

While such a proposal minimizes the weight that must he shifted by the operator, it poses numerous disadvantages. For one, in the usual case, at least one of the adjustable connections must be locked prior to actuation of the apparatus requiring an effort to be expended by the operator in locking the connection. This is, of course, time consuming to some degree and lengthens the time required to perform each tire changing operation.

Moreover, in apparatus wherein the drive for the upper bead loosener is linked mechanically to the tool driving shaft, it will be appreciated that when a tool is driven by the apparatus, the upper bead loosener will be in motion, even though unneeded, and may pose a hazard to the operator or bystanders in the immediate vicinity of the apparatus. Thus, while a weight reduction is achieved, it is made only at the expense of time and safety.

In many instances, such tire changing apparatus have been provided with means for limiting the movement of the lower bead loosening shoe, particularly when the apparatus is designed for accomodating wheels of vastly varying diameters, particularly, small diameter wheels. Those skilled in the art will readily recognize that the lower bead loosener must have a relatively long throw for small wheels such as ten inch wheels in order to change them successfully. However, if the long throw is maintained for wheels of all sizes, there is the very real possibility that for larger wheels, the lower bead loosener will come into contact with the drop center of the wheel and the continued application of force will cause damage to the lower bead loosening shoe, the wheel, or both. Wheel and/or shoe damage may also occur when wheels having narrow rims are serviced for essentially the same reason.

As a consequence, many tire changing machines have been provided with a stroke limiter which may be in, for example, the form disclosed in U.S. Pat. No. 3,398,777 issued Aug. 27, 1968 to Strang. Such stroke limiting means have proved to be very effectual but require a fair number of components thereby contributing to the expense of the apparatus.

SUMMARY OF THE INVENTION

It is the principal object of the invention to provide a new and improved tire changing apparatus.

According to one aspect of the present invention, the weight requiring shifting during the positioning of an upper bead loosener assembly is minimized in a tire changer including a base, a table mounted on the base and having a surface for receiving and supporting a wheel having a tire to be serviced, an upper bead loosener assembly for engaging and loosening the uppermost bead of a tire on a wheel supported by the table and a motor for moving the assembly into engagement with the upper bead. The invention contemplates the improvement including a guide mounting the assembly for movement in a path toward and away from the table surface, means mounting the guide for movement generally radially of a wheel supported on the table, first and second brake surfaces, one on the guide and the other either on the table or the base, and means responsive to actuation of the motor for engaging the brake surfaces to lock the guide against the aforementioned radial movement whereby the upper bead loosener may be properly positioned and locked in that position through automatic engagement of the brake surfaces.

According to another aspect of the invention, the upper bead loosener assembly may be disconnected from the motor of the apparatus when a tool driving post is utilized to avoid a safety hazard. This aspect of the invention contemplates the provision of a tire changing apparatus having a base with a table mounted on the base for receiving and supporting a wheel to be serviced. A rotatable tool driving post extends through the table and an upper bead loosener assembly is engageable with the upper side wall of a tire on a wheel received on the table. A power trasmitting mechanism, including a lever with spaced parts, is provided for rotating the post and moving the upper bead loosener. A motor drives the power transmitting mechanism and there is included a selectively operable connection whereby the upper bead loosener may be selectively connected or disconnected to the lever between the spaced parts. The inventive improvement comprises a guide mounting the upper bead loosener for reciprocating movement along an axis toward and away from the table as well as for rotation about the axis. The invention provides an improved selectively operable connection including projections on the upper bead loosener between the spaced parts of the lever defining a first surface having a length greater than the space between the parts and a width less than the space between the parts. Second surfaces are disposed on the parts and are engageable with the first surface to couple the upper bead loosener to the lever for movement with the lever when the upper bead loosener is rotated within the guide to position the first surface across the space between the parts. The upper bead loosener may be disengaged from the lever by rotating the same within the guide to dispose the first surface between the parts.

Still another aspect of the invention contemplates a tire changer wherein the stroke of the lower bead loosener may be selectively altered for wheels having widely varying characteristics. The invention is embodied in a tire changer including a base, a table mounted on the base for supporting a wheel to be serviced, a lower bead loosener shoe, means mounting the shoe on the base for movement toward and away from the table in a path generally radially of a wheel received thereon, and a motor for moving the shoe into the path. The inventive improvement comprises a telescoping connection between the motor and the shoe such that the shoe may be moved within the path without energization of the motor. Stop means are associated with the connection and are normally operative to maintain the shoe in a first predetermined relation with respect to the motor when the shoe is moved toward the table by the motor. A selectively operable latch is associated with the connection for maintaining the shoe in a second predetermined relation to the motor, the shoe, when in the second predetermined relation being closer to the table than when in the first predetermined relation to facilitate the loosening of beads of tires on small or narrow wheels.

Other objects and advantages will become apparent from the following specification taken in connection with the accompanying drawings.

DESCRIPTION OF THE DRAWINGS

FIG. 1 is a side elevation of a tire changing apparatus made according to the invention with parts broken away and parts shown in section for clarity;

FIG. 2 is a plan view of the tire changing apparatus with certain components removed for clarity;

FIG. 3 is an end view of the apparatus;

FIG. 4 is an enlarged view of a latch employed in connecting the lower bead loosener to the power source.

DESCRIPTION OF THE PREFERRED EMBODIMENT

An exemplary embodiment of a tire changing apparatus made according to the invention is illustrated in FIG. 1 and is seen to include a base 10 including generally vertical channels 12 mounting a table 14 which is adapted to receive and support a wheel for tire mounting and demounting operations. An externally threaded spindle 16 extends upwardly and centrally of the table 14 for positioning the wheel and a hold down cone 18 is adapted to be threadably received on the spindle 16. The usual spring biased pin 20 also extends upwardly through the table 14 for engagement with lug bolt hole on a wheel to prevent rotation of the wheel when on the table 14.

Journalled in the spindle 16 is a rotatable center post 22 having on its top a tool driving formation 24 which may be of coventional construction.

A vertical shaft 26 is journalled in the base by bearings 28 and suitably connected to the center post 22. At its lower end, the shaft 26 mounts a spur gear 30 in engagement with a rack 32. The rack 32 is in turn connected by a pin and slot connection 34 to the lower end of an arm 36 which is rotatable about a pivot axis defined by a shaft 38. The shaft 38 is journalled in suitable bearings in the channels 12 and it will be appreciated that as the shaft 38 is rotated, the arm 36 will be moved in an arcuate path to drive the rack 32 and thereby inpart rotation to the center post 22 for purposes for driving a tool received on the tool receiving formation 24.

A power arm 40 is secured to the shaft 38 and extends to the left thereof as seen in FIG. 1. A single acting fluid motor 42 is pivoted at 44 between two of the channels 12 and has a reciprocating output rod connected by a pivot pin 48 to the power arm 40. Thus, when the motor 42 is actuated as, by, a supply of air under pressure, the rod 46 will extend to drive the power arm 40 and the arm 36 in a clockwise direction. To limit the speed of such movement, a dashpot 50 suitably interconnects the base 10 and the power arm 40.

At its left hand end, as viewed in FIG. 1, the power arm 40 mounts a lower bead loosener shoe assembly, generally designated 52, by a telescoping connection, generally designated 54. The lower bead loosener shoe 52 is connected to a yoke 56 which in turn is mounted on a tube 58 of square or rectangular cross-section which in turn is received within a similarly shaped sleeve 60 mounted on the end of the power arm 40.

As best seen in FIG. 4, one of the surfaces of the tube 58, preferably the upper most surface, is provided with a pair of elongated slots 62 and an intermediate aperture 64. Removable pins 66 extend through bores (not shown) in the corresponding surface of the sleeve 60 to be received in the slot 62 with the consequence that the tube 58 is reciprocally received in the sleeve 60 for movement relative thereto.

In the usual case, the pins 66 operate as stop means limiting movement of the assembly 52 away from the table 14 within the connection 54 to a position wherein the lower surface 70 of the yoke is spaced somewhat above the upper surface 72 of the sleeve 60. It will also be appreciated that simply by exerting a pulling force on the assembly 52, the same may be elevated toward the table 14 without actuation of the fluid motor 42 a distance equal to the length of the slots 62.

With additional reference to FIG. 1, the upper surface of the sleeve 60 mounts a pair of upstanding ears 74 which receive a pivot pin 76. The pivot pin 76 journals an L-shaped latch 78 for rotation on the sleeve 60 and the latch 78 includes a downwardly directed dog 80 which is movable through a hole (not shown) in the upper surface of the sleeve 60. A spring 82 (FIG. 4) is operative to bias the latch 78 in a counterclockwise direction as viewed in FIG. 1 so as to urge the dog 80 downwardly through the hole in the sleeve 60.

When the assembly 52 is manually elevated, the dog 80 under the bias of the spring 82 will enter the hole 64 in the tube 58 to thereby latch the assembly 52 in an extended position. In such a position, the throw of the lower bead loosener assembly 52 is increased so as to usable in loosening the lower bead on small diameter wheels. Conversely, when the components are in the configuration illustrated in FIGS. 1 and 4, the throw of the assembly 52 is decreased to a point to be sufficient for wheels of average size and for use on wheels having narrow rims.

When extremely large wheels are to be utilized, the throw may be decreased even further by removing the pins 66 to allow the surface 70 of the yoke 56 to abut the surface 72 of the sleeve 60.

Because damage to average size wheels could occur if the assembly 52 were moved to an extended position for small diameter wheels and the apparatus subsequently used in loosening the beads of larger wheels, means are provided for automatically returning the lower bead loosening assembly 52 to the position illustrated in FIGS. 1 and 4 whereat it is adjusted for average size wheels.

A one way trip bar 90 (FIG. 1) extends between two links 92 (only one of which is shown) pivotally mounted by pivots 94 to the machine. Clockwise movement of the trip bar 90 is limited by a pin 96 which may abut one or both of the links 92. The one way trip bar 90 is disposed to be engaged by the upper end of the L-shaped latch 78 when the lower bead loosener assembly 52 is moved toward and away from the table 14 by the fluid motor 42. When the assembly 52 is moving upwardly, the trip bar 90 is merely rotated in a counterclockwise direction and has no effect on the latch 78. However, when the dog 80 has moved into the aperture 64 (FIG. 4) in the tube 58, it will be appreciated that the upper end of the latch 78 will engage the trip bar 90 when the assembly 52 descends. Since clockwise movement of the trip bar 90 is limited by the pin 96, during such downward movement of the assembly, the latch 78 will be rotated in a clockwise direction via engagement with the trip bar 90 thereby withdrawing the dog 80 from the aperture 64. Once the dog 80 is free of the aperture 64, the weight of the assembly 52 will cause the same to slide downwardly within the sleeve 60 until further such movement is restrained by the pins 66.

Consequently, for each cycle of the apparatus, whenever the assembly 52 has been extended for small diameter wheels, it will automatically be reset for average size wheels upon its descent. Thus, it is impossible for one to inadvertantly service an average size wheel when the apparatus is set up for a small diameter wheel.

The apparatus is also provided with an upper bead loosener assembly, generally designated 100. The same includes an upper bead loosener shoe 102 which may be constructed generally along the lines disclosed in the previously identified Strang et al patent and it will be observed that the assembly 100 does not include a positioning nose such as utilized by Strang, et al.

The shoe 102 is pivotally mounted on a carrier 104 having a manipulating handle 106.

A drive or mounting shaft for the assembly 100 includes an upper, square cross-section tube 108 suitably joined to a lower, cylindrically shaped tube 110. The carriage 104 is mounted for reciprocation on the tube 108 and may be provided with a one way detent mechanism 111 forming no part of the present invention and having a handle 112 which may be used in concert with the handle 106 for positioning the shoe 102. The detent mechanism 111 prevents the tube 108 from moving downwardly with respect to the carriage 104 except when an upward force is exerted on the handle 112 while allowing free movement of the carriage 104 downwardly on the tube 108 to abut the upper end of the tube 110. Thus, to vertically orient the shoe 102 with respect to the upper side wall of a tire on a wheel received on the table, one need only exert an upward force on the handle 112, and possibly the handle 106 as well to elevate the carrier 104, and thus the shoe 102, on the tube 108. The same may be released with only a slight upward force on the handle 112 to allow the assembly 100 to descend into engagement with the side wall of the tire. Thereafter, by means to be seen, when the tubes 108 and 110 are moved downwardly, the shoe 102 will be moved downwardly to loosen the upper bead on the tire. It will be readily appreciated that the only weight being shifted against the influence of gravity is that of the shoe 102, the carrier 104 and the detent 111, a sizable weight reduction over the weight of the components to be shifted in a construction made according to Strang, et al.

The tube 110, which, it will be recalled, is cylindrical in cross-section, is slidably received within a round tube 120 which guides the tube 110, and thus the shoe 102, for reciprocating movement towards and away from the surface of the table 14.

The tube 120, as best seen in FIGS. 1 and 3, is supported by cross members 122 extending between two channels 124. The channels 124 are pivoted to the base 10 at their lower ends by a pivot pin 126. As a consequence, it will be appreciated that the guide tube 120, and thus the shoe 102, is mounted for shifting movement in a direction generally radially of a wheel received on the table 14. By rotating those components about the axis of the pivot 126, the position of the shoe 102 may be suitably adjusted for wheels of varying diameter.

In order to maintain the adjustment mentioned in the aforegoing paragraph, each of the channels 124, near their upper ends, mounts an upwardly directed brake surface 130 which, as best seen in FIG. 1, have upwardly directed teeth 132.

A bale 134 is pivoted on the shaft 38 and mounts, near its upper end, downwardly directed brake surfaces 136. The brake surfaces 136 include downwardly directed teeth 138 which are engageable with the teeth 132 as well as being relatively movable with respect thereto by reason of the pivoting of the bale 134 on the shaft 38.

As seen in FIG. 1, the surfaces 130 and 136 are spaced allowing the free pivoting of the guide for the upper assembly 100 about the pivot 126 to achieve the foregoing adjustment. Once the adjustment has been made, the surfaces 130 and 136 are brought into engagement with each other by pivoting the bale 134 in a clockwise direction as viewed in FIG. 1 about the pivot pin 38. As will be seen, this is accomplished automatically in response to actuation of the fluid motor 42.

The tube 110 extends below the lowermost end of the guide tube 120 as seen in FIGS. 1 and 3 and mounts a transversely extending pin 140 adjacent its lower end. The pin 140 extends from both sides of the tube 110.

The power arm 40 includes a rightward extension (as viewed in FIG. 1) from the pivot pin 38, which extension is designated 144. As best seen in FIGS. 2 and 3, the extension 144 is defined by two spaced plates or parts 146 which flank the tube 110 and the guide tube 120. Each of the plates 146 includes a horizontally elongated slot 148 having upper and lower surfaces 150 and 152 respectively.

Because the tube 110 and the tube 120 are cylindrical, it will be appreciated that the former may be rotated within the latter. The length of the pin 140 is made such that when the shoe 102 is facing the table 14 as seen in FIGS. 1 and 3, it has a length greater than the sapce between the plates 146 and therefore may be rotated to enter the slots 148. Consequently, when the fluid motor 42 is energized to move the power arm 40 and the extension 144 in a clockwise direction, the upper surfaces of the slots 148 will engage the upper surface of the pin 140 on opposite sides of the tube 110 to drive the tube 110 downwardly within the guide tube 120 to cause the shoe 102 to loosen the upper bead of a tire on a wheel on the table 14.

When it is desired to rotate the tool driving shaft 22 without operating the upper bead loosening assembly 100, the latter may be rotated 90° to the position illustrated in FIG. 2. In such a case, the pin 140 will be rotated to assume a position between the plates 146. Consequently, the pin 140 will not be engaged by the surfaces 150 of the slots 148 to move the assembly 100 downwardly. Nonetheless, the rack 32 (FIG. 1) will be advanced to rotate the shaft 22 to thereby drive a tool associated therewith.

A coil spring 154 of the compression type extends between suitable caps to bias the tube 110 upwardly within the tube 120 to move the same to its uppermost position. The spring 154 thereby provides for restoration of the upper assembly 100 whenever the fluid motor 42 is deenergized. The power arm 40 and its extension 144 may be returned to the position illustrated in FIG. 1 upon deenergization of the motor 42 by an internal spring return within the motor 42.

In any event, should the spring 154 fail, it will be appreciated that during the return, the lower surfaces 152 of the slots 148 will engage the undersurface of the pin 140 to elevate the same.

Returning to the brake surfaces 130 and 136, it will be observed that a pair of tension springs 156 interconnect the extension 144 of the power arm 40 and the bale 134. As a consequence, during actuation of the motor 42, the clockwise movement of the extension 144 about the pivot 38 will lengthen the springs 156 so that the same will pull the bale 34 downwardly thereby engaging the teeth 138 with the teeth 132 to immediately lock the guide tube 120 in the proper position at the beginning of the bead loosening operation. At the same time, the springs 156 may yield to allow full travel of the extension 144 of the power arm 40 to insure loosening of the upper bead.

To insure that the bale 134 is pivoted sufficiently to move the brake surface 136 out of engagement with the surface 130 when the fluid motor 42 is deactuated, a pin 158 extends across the bale 134 and is positioned to be engaged by the upper surface of the plates 146 as they approach their counterclockwisemost position. Upon engagement of the pin 158 by the upper surfaces of the plates 146, the bale 134 is pivoted in a counterclockwise direction thereby elevating the brake surface 136 out of contact with the brake surface 130. As a consequence, the guide tube 120 is then free to be pivoted to set up the upper bead loosener 102 for positioning on the next wheel to be serviced.

From the foregoing, it will be appreciated that a tire changer made according to the ivention minimizes the weight that must be shifted against the influence of gravity during adjustment of an upper bead loosener assembly and yet makes it possible to disengage the upper bead loosener assembly from the drive system when the same is not required and when the drive system is to be utilized to drive the tool rotating shaft 22. It will also be appreciated that the same provides a simple and economical structure whereby the machine may be easily adjusted to increase the throw of the lower bead loosener for small diameter wheels and yet provides for restoration of the lower bead loosener after each operation to prevent the possibility of damage to average or large size wheels after use on small size wheels.

I claim:

1. In a tire changing apparatus including a base; a table mounted on the base for receiving and supporting a wheel; a rotatable, tool driving post extending through the table; an upper bead loosener assembly engageable with the upper side wall of a tire on a wheel received on the table, a power transmitting mechanism, including a lever with spaced parts, for rotating the post and moving the upper bead loosener, a motor for driving the power transmitting mechanism, and a selectively operable connection whereby the upper bead loosener may be selectively connected or disconnected to the lever between the spaced parts, the improvement comprising a guide on said base mounting the upper bead loosener for reciprocating movement along an axis towards and away from said table and for rotation about said axis, and wherein said selectively operable connection comprises projections on said upper bead loosener between the spaced parts of said lever defining a first surface having a length greater than the space between said parts and a width less than the space between said parts, and a second surface on said parts and engageable with said first surface to couple said upper bead loosener to said lever for movement with said lever toward said table and along said axis when said upper bead loosener is rotated within said guide to position said first surface across the space between said parts, said upper bead loosener being disengageable from said lever by rotating said upper bead loosener within said guide to dispose said first surface between said parts.

2. The tire changing apparatus of claim 1 wherein said parts have third surfaces spaced from said second surfaces and engageable with said upper bead loosener when said first surface is positioned across the space between said parts for moving said upper bead loosener with said lever in a direction away from said table and along said axis.

3. The tire changing apparatus of claim 2 wherein said second and third surfaces are defined by opposite sides of slots in said parts.

4. The tire changing apparatus of claim 3 wherein said projections are defined by a pin.

5. In a tire changing apparatus having a base, a table mounted on the base for receiving and supporting a wheel to be serviced, a lower bead loosener shoe, means mounting the shoe on the base for movement toward and away from the table in a path generally radially of a wheel received thereon, and a motor for moving the shoe in said path, the improvement comprising: a telescoping connection between said motor and said shoe such that said shoe may be moved within said path without energization of said motor, stop means associated with said connection and normally operative to maintain said shoe in a first predetermined relation to said motor when said shoe is moved toward said table by said motor, and a selectively operable latch associated with said connection for maintaining said shoe in a second predetermined relation to said motor, said shoe when in said second predetermined relation being closer to said table than when in said first predetermined relation to facilitate the loosening of beads of tires on small wheels.

6. In a tire changing apparatus having a base, a table mounted on the base for receiving and supporting a wheel to be serviced, a lower bead loosener shoe, means mounting the shoe on the base for movement toward and away from the table in a path generally radially of a wheel received thereon, and a motor for moving the shoe in said path, the improvement comprising: a telescoping connection between said motor and said shoe such that said shoe may be moved within said path without energization of said motor, stop means associated with said connection and normally operative to maintain said shoe in a first predetermined relation to said motor when said shoe is moved toward said table by said motor, a selectively operable latch associated with said connection for maintaining said shoe in a second predetermined relation to said motor, said shoe when in said second predetermined relation being closer to said table than when in said first predetermined relation to facilitate the loosening of beads of tires on small wheels, and means for automatically releasing said latch when said motor is moving said shoe away from said table to facilitate return of said shoe to said first predetermined relation.

7. The tire changing apparatus of claim 6 wherein said connection has at least a partial vertical orientation and said shoe in said second predetermined relation is higher than when in said first predetermined relation whereby upon release of said latch, said shoe will return to said first predetermined relation under the influence of gravity.

8. The tire changer apparatus of claim 6 wherein said latch is biased to latch said shoe in said second predetermined relation upon movement of said shoe thereto and wherein said automatic releasing means comprises a one way trip element for moving said latch against said bias.

9. The tire changing apparatus of claim 6 wherein said stop means are removable to permit said shoe to move to a third predetermined relation to said motor further from said table than said first predetermined relation.

10. In a tire changing apparatus including a base, a table mounted on the base and having a surface for receiving and supporting a wheel having a tire to be serviced, an upper bead loosener assembly for engaging and loosening the upper-most bead of a tire on a wheel supported by the table, and a motor for moving the assembly into engagement with an upper bead, the improvement comprising: a guide mounting said assembly for movement in a path toward and away from said surface; means mounting said guide for movement generally radially of a wheel supported on the table; first and second relatively movable brake surfaces, one on said guide and the other on either said table or said base; and means responsive to actuation of said motor for engaging said brake surfaces to lock said guide against said generally radial movement.

11. The tire changing apparatus of claim 10 wherein said brake surfaces have interengaging teeth.

12. In a tire changing apparatus including a base, a table mounted on the base and having a surface for receiving and supporting a wheel having a tire to be serviced, an upper bead loosener assembly for engaging and loosening the upper-most bead of a tire on a wheel supported by the table, and a motor for moving the assembly into engagement with an upper bead, the improvement comprising: a guide mounting said assembly for movement in a path toward and away from said surface; means pivotally mounting said guide for movement such that assembly can be adjustably located generally radially of a wheel supported on the table; first and second relatively movable brake surfaces, one on said guide and the other on either said table or said base; and means responsive to actuation of said motor for engaging said brake surfaces to lock said guide against said generally radial movement.

13. The tire changing apparatus of claim 12 wherein said responsive means include linkage means interconnecting said motor and one of said brake surfaces for effecting relative movement of the brake surface to engage each other when said motor is actuated.

14. The tire changing apparatus of claim 12 wherein said bead loosener assembly comprises a bead loosener shoe and a mounting shaft, said mounting shaft being received by said guide, and means adjustably mounting said shoe on said mounting shaft.

15. In a tire changing apparatus having a base; a table mounted on the base for receiving and supporting a wheel to be serviced; an upper bead loosener assembly movable in a path towards and away from a tire on a wheel received on the table into and out of engagement with the upper bead thereof; an arm movably mounted on the base and associated with the assembly for moving the assembly in the path; and a motor connected to the arm and actuatable to drive said arm, the improvement comprising: a guide mounted on said base and movably receiving said assembly for guiding said assembly in said path; means pivotally mounting said guide on said base for shifting movement generally radially of a wheel on said table to allow said assembly to be selectively positioned to engage the upper bead of any of a variety of different diameter tires; a first brake surface carried by said guide; a second brake surface movably mounted on said apparatus and engageable with said first brake surface to lock said guide against said shifting movement, yieldable means interconnecting said arm and said second brake surface so that movement of said arm in response to actuation of said motor will cause said second brake surface to move into engagement with said first brake surface; and means for moving said second brake surface out of engagement with said first brake surface when said motor is not actuated to allow said assembly to be selectively positioned.

16. The tire changing apparatus of claim 15 wherein said yieldable means comprises a spring and said moving means comprises a surface on said arm for engaging said second brake surface.

* * * * *